(12) United States Patent
Yamaguchi

(10) Patent No.: US 12,392,703 B2
(45) Date of Patent: Aug. 19, 2025

(54) DENSITY GRADIENT LIQUID PRODUCTION APPARATUS, DENSITY GRADIENT LIQUID PRODUCTION METHOD, PARTICLE DIAMETER DISTRIBUTION MEASUREMENT SYSTEM, AND PARTICLE DIAMETER DISTRIBUTION MEASUREMENT METHOD

(71) Applicant: HORIBA, LTD., Kyoto (JP)

(72) Inventor: Tetsuji Yamaguchi, Kyoto (JP)

(73) Assignee: HORIBA, LTD., Kyoto (JP)

( * ) Notice: Subject to any disclaimer, the term of this patent is extended or adjusted under 35 U.S.C. 154(b) by 172 days.

(21) Appl. No.: 18/256,341

(22) PCT Filed: Nov. 15, 2021

(86) PCT No.: PCT/JP2021/041914
§ 371 (c)(1),
(2) Date: Jun. 7, 2023

(87) PCT Pub. No.: WO2022/124016
PCT Pub. Date: Jun. 16, 2022

(65) Prior Publication Data
US 2024/0035947 A1    Feb. 1, 2024

(30) Foreign Application Priority Data
Dec. 9, 2020    (JP) .................. 2020-204339

(51) Int. Cl.
*G01N 15/02* (2024.01)
*G01N 15/04* (2006.01)

(52) U.S. Cl.
CPC ........... *G01N 15/02* (2013.01); *G01N 15/042* (2013.01)

(58) Field of Classification Search
CPC ...... G01N 9/30; G01N 15/042; G01N 15/045; G01N 15/0205; G01N 15/0211;
(Continued)

(56) References Cited

U.S. PATENT DOCUMENTS 8,551,417 B2 * 10/2013 Shiraishi ............... B01J 19/26
                                                         422/138
11,172,894 B2 * 11/2021 Taguchi ............... A61B 6/5205
(Continued)

FOREIGN PATENT DOCUMENTS

JP      50-038760 U    4/1975
JP      61-015937 Y    5/1986
(Continued)

OTHER PUBLICATIONS

International Search Report for the corresponding patent application No. PCT/JP2021/041914 dated Jan. 25, 2022, with English translation.

Primary Examiner — Tarifur R Chowdhury
(74) Attorney, Agent, or Firm — LUCAS & MERCANTI, LLP

(57) ABSTRACT

Provided is a density gradient liquid production apparatus for producing a density gradient liquid in a measurement cell for a centrifugal sedimentation type particle diameter distribution measurement device and comprises a first solution preparation unit that prepares a first solution with a predetermined target concentration and a first density by mixing a plurality of first reference solutions each of whose concentrations of an agglomeration inhibiting component that inhibits agglomeration of particles differs, and a second solution preparation unit that prepares a second solution with the predetermined target concentration and a second density that is different from the first density by mixing a plurality of second reference solutions each of whose concentrations of the agglomeration inhibiting component dif-
(Continued)

fers, and a mixed solution preparation unit that creates a mixed solution with the target concentration by mixing the first solution and the second solution and supplies the created mixed solution to the measurement cell while varying a density of the mixed solution.

12 Claims, 5 Drawing Sheets

(58) Field of Classification Search
CPC ............... G01N 35/04; G01N 35/1009; G01N 2015/0053; G01N 2015/0222; G01N 21/07; B01F 23/023; B01F 35/81; B04B 1/08; Y10T 436/25; Y01T 436/25375
USPC ...... 356/246, 432–440, 335–343, 33–36, 73; 366/341, 336, 181.5, 181.6, 182.1, 182.2; 422/224, 135, 138, 198, 109, 246, 422/432–440, 335–343, 33–36, 73
See application file for complete search history.

(56) References Cited

U.S. PATENT DOCUMENTS

| | | |
|---|---|---|
| 2002/0131894 A1 | 9/2002 | Anderson |
| 2014/0026786 A1* | 1/2014 | Jaffel ................... C04B 38/106 106/680 |
| 2019/0346354 A1 | 11/2019 | Yamaguchi |
| 2021/0310925 A1 | 10/2021 | Yamaguchi et al. |

FOREIGN PATENT DOCUMENTS

| | | |
|---|---|---|
| JP | 62-102136 A | 5/1987 |
| WO | 2018/092573 A1 | 5/2018 |
| WO | 2020/090775 A1 | 5/2020 |

* cited by examiner

DENSITY GRADIENT LIQUID PRODUCTION APPARATUS, DENSITY GRADIENT LIQUID PRODUCTION METHOD, PARTICLE DIAMETER DISTRIBUTION MEASUREMENT SYSTEM, AND PARTICLE DIAMETER DISTRIBUTION MEASUREMENT METHOD

CROSS REFERENCE TO RELATED APPLICATION

This Application is a 371 of PCT/JP2021/041914 filed on Nov. 15, 2021, which, in turn, claims priority of Japanese Patent Application No. 2020-204339 filed on Dec. 9, 2020, and the above applications are incorporated herein by reference.

FIELD OF THE ART

This invention relates to a density gradient liquid production apparatus and a density gradient liquid production method for producing a density gradient liquid in a measurement cell for a centrifugal sedimentation particle diameter distribution measurement device, and to a particle diameter distribution measurement system and a particle diameter distribution measurement method using the density gradient liquid production apparatus and the density gradient liquid production method.

BACKGROUND ART

In a line start method using a centrifugal sedimentation particle diameter distribution measurement device, each particle contained in the measurement sample is separated by each of particle diameters in a measurement cell by injecting a measurement sample into a sucrose density gradient liquid produced in the measurement cell and rotating the density gradient liquid to apply a centrifugal force to the density gradient liquid.

Conventionally, a density gradient liquid is produced in the measurement cell using a density gradient liquid production apparatus. As this kind of the density gradient liquid production apparatus known is, for example, a density gradient liquid production apparatus that produces the density gradient liquid by adjusting sucrose solutions of various densities by mixing two sucrose solutions of different densities in different ratios and supplying the sucrose solutions to the measurement cell in such a way that the density gradually increases (for example, Patent document 1).

PRIOR ART DOCUMENTS

Patent Documents

Patent Document 1: Japanese Examined Utility Model Application Publication No. 61-015937

SUMMARY OF THE INVENTION

Problems to be Solved by the Invention

It is necessary to produce a density gradient liquid used in the line start method by adjusting a pH of the liquid for each sample type and particle diameter to keep the particles contained in an injected sample as far away from the isoelectric point as possible so that they do not aggregate in the density gradient liquid. Conventionally, in order to prepare a density gradient liquid with a target pH (hereinafter also referred to as "target pH"), a plurality of sucrose solutions with the target pH are prepared manually using pH adjusters such as acidic or alkaline solutions, which are then set in the density gradient liquid production equipment to prepare a density gradient liquid with the target pH. However, with this method, for example, when measuring a large number of samples of different types and different particle diameters, or when conducting experiments in which the pH of the density gradient liquid is set to various values, it is necessary for the user to manually prepare a large number of sucrose solutions with different densities at different pH for each density gradient liquid to be produced. This is very inefficient. The same problem can be said about inhibiting agglomeration of particles by adjusting the concentration of surface-active agent in the density gradient liquid.

The present claimed invention is made in view of these problems, and a main object of this invention is to provide a density gradient liquid production apparatus that can efficiently produce multiple density gradient liquids with different concentrations of agglomeration inhibiting components.

Means to Solve the Problems

More specifically, a density gradient liquid production apparatus in accordance with this invention is for producing a density gradient liquid in a measurement cell for a centrifugal sedimentation type particle diameter distribution measurement device, and is characterized by comprising a first solution preparation unit that prepares a first solution with a predetermined target concentration and a first density by mixing a plurality of first reference solutions each of whose concentrations of an agglomeration inhibiting component that inhibits agglomeration of particles differs, and a second solution preparation unit that prepares a second solution with the predetermined target concentration and a second density that is different from the first density by mixing a plurality of second reference solutions each of whose concentrations of an agglomeration inhibiting component differs, and a mixed solution preparation unit that creates a mixed solution with the target concentration by mixing the first solution and the second solution and supplies the created mixed solution to the measurement cell while varying a density of the mixed solution.

In accordance with this arrangement, since the first solution and the second solution with the target concentration can be prepared by mixing a plurality of the reference solutions each of whose concentrations of an agglomeration inhibiting component that inhibits agglomeration of particles differs and the density gradient liquid with the target concentration can be produced in the measurement cell by using the prepared first solution and the prepared second solution, it is possible to efficiently produce a plurality of the density gradient liquids with different concentrations of the agglomeration inhibiting component. More specifically, if the density gradient liquid production apparatus of this invention is used, there is no need for a user to prepare the first solution and the second solution individually by adjusting the concentration of the agglomeration inhibiting component according to the concentration of the agglomeration inhibiting component in the density gradient liquid to be produced. If at least two first reference solutions and two second reference solutions with different concentrations of agglomeration inhibiting component are produced for preparing the first solution and the second solution respectively, density gradient liquids with arbitrary concentrations of agglomeration inhibiting component can be produced using the prepared first solution and the prepared second solution so that it is possible to effectively produce a plurality of the density gradient liquids with different concentrations of the agglomeration inhibiting component.

The agglomeration inhibiting component is concretely a hydrogen ion ($H^+$) or a surface-active agent that determines a pH of a solution.

It is preferable that the first solution preparation unit prepares the first solution by mixing a plurality of the first reference solutions each of whose densities is equal, and the second solution preparation unit prepares the second solution by mixing a plurality of the second reference solutions each of whose densities is equal.

In accordance with this arrangement, since there is no need of preparing a mixing ratio of each of the reference solutions to make the first solution and the second solution with the target density respectively, the first solution and the second solution can be prepared more easily.

It is preferable that the agglomeration inhibiting component is the hydrogen ion ($H^+$), the first solution preparation unit prepares the first solution by mixing the acidic first reference solution with the alkaline first reference solution, and the second solution preparation unit prepares the second solution by mixing the acidic second reference solution with the alkaline second reference solution.

In accordance with this arrangement, it is possible to produce the density gradient liquids of any pH value of acidic, neutral or alkaline.

As a concrete arrangement of the density gradient liquid production apparatus represented is that each of the first solution preparation unit and the second solution preparation unit comprises a plurality of primary pumps each of which feeds a plurality of the reference solutions respectively, and a primary mixing unit that mixes the reference solutions fed from each of the primary pumps, and the solution with a desired concentration of the agglomeration inhibiting component is prepared by changing a volume ratio of the solutions fed by each of the primary pumps.

As a concrete arrangement of the density gradient liquid production apparatus represented is that further comprises a target concentration obtaining unit that obtains a value of the target concentration from a user, and a primary pump control unit that controls a rotation speed of each of the primary pumps provided by the first solution preparation unit and the second solution preparation units respectively according to the obtained target concentration value.

As a concrete arrangement of the density gradient liquid production apparatus represented is that the mixed solution preparation unit comprises two secondary pumps that feed the first solution and the second solution respectively, and a secondary mixing unit that mixes the first solution and the second solution fed from each of the secondary pumps, and the density of the mixed solution to be created is varied by changing the volume ratio of the solutions fed by each of the secondary pumps.

In order to make it possible to produce a required amount of the density gradient liquid in accordance with the capacity of the measurement cell, it is preferable to further comprise a cell capacity obtaining unit that obtains a capacity of the measurement cell from the user, and a secondary pump control unit that controls the rotation speed of each of the secondary pumps according to the obtained capacity of the measurement cell.

In addition, the density gradient liquid production apparatus preferably comprises the primary pump and the secondary pump both of which are micropumps.

In accordance with this arrangement, since the fed volume of each of the reference liquid, the first solution, and the second solution is controlled by the micropumps, even if the volume of the measurement cell is small and the density gradient liquid to be produced is small, it is possible to accurately control the density of the density gradient liquid and the concentration of the agglomeration inhibiting component.

In addition, the density gradient liquid production method of this invention is a method for producing a density gradient liquid in a measurement cell for a centrifugal sedimentation particle diameter distribution measurement device, and is characterized by comprising a first solution preparation process for preparing a first solution with a predetermined target concentration and a first density by mixing a plurality of first reference solutions each of whose concentrations of an agglomeration inhibiting component that inhibits agglomeration of particles differs, a second solution preparation process for preparing a second solution with the target concentration and a second concentration different from the first concentration by mixing a plurality of second reference solutions each of whose concentrations of the agglomeration inhibiting component differs, and a mixed solution preparing process for creating a mixed solution with the target concentration by mixing the first solution and the second solution and supplies the created mixed solution to the measurement cell while varying a density of the mixed solution.

In accordance with the density gradient liquid production method, the same effect as that of the above-mentioned density gradient liquid production apparatus can be produced.

In addition, the particle diameter distribution measurement system of this invention is characterized by comprising the density gradient liquid production apparatus of the above-mentioned invention, and a centrifugal sedimentation particle diameter distribution measurement apparatus that measures particle diameter distribution by a line start method using the density gradient liquid produced by the density gradient liquid production apparatus.

In addition, a particle diameter distribution measurement method of this invention is characterized by measuring particle diameter distribution by the line start method using the density gradient liquid produced by the above-mentioned density gradient liquid production method of this invention and a centrifugal sedimentation type particle diameter distribution measurement device.

In accordance with the particle diameter distribution measurement device and the particle diameter distribution measurement method, the same effect can be produced as that of the present claimed density gradient liquid production apparatus.

Effects of the Invention

According to the present claimed invention, it is possible to provide the density gradient liquid production apparatus that can effectively produce a plurality of the density gradient liquids each of whose concentrations of the agglomeration inhibiting component differs.

EXPLANATION OF THE CODES

Figure 1:
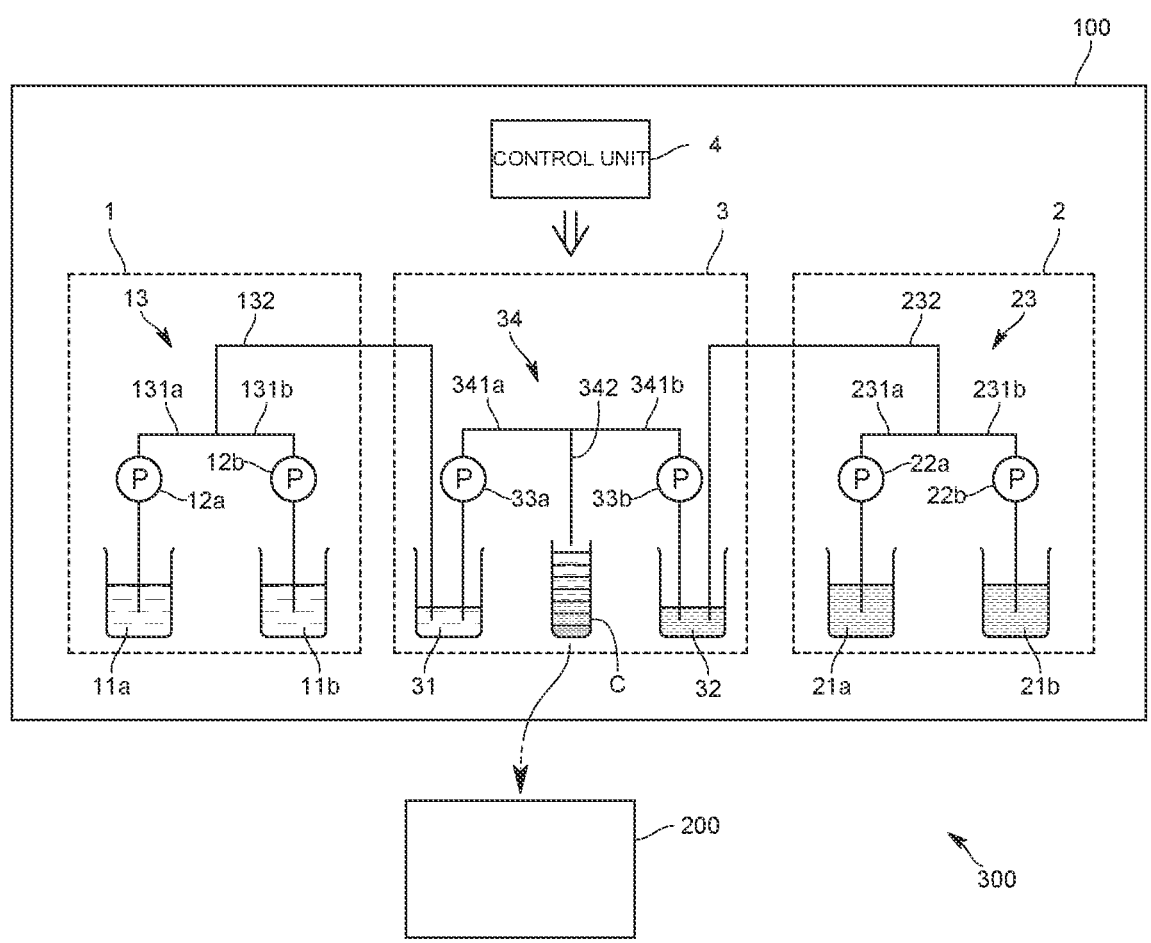
FIG. 1 A view schematically showing a configuration of a density gradient liquid production apparatus of this embodiment.

100 . . . density gradient liquid production apparatus
1 . . . first solution preparation unit
11a, b . . . first reference sucrose solution (first reference solution)
2 . . . second solution preparation unit
21a, b . . . second reference sucrose solution (second reference solution)
3 . . . mixed solution preparation unit
31 . . . first sucrose solution
32 . . . second sucrose solution
C . . . measurement cell Best Modes of Embodying the Invention A density gradient liquid production apparatus 100 in accordance with the present claimed invention will be explained with reference to drawings.

As shown in FIG. 1, the density gradient liquid production apparatus 100 of this embodiment is used together with a centrifugal sedimentation type particle diameter distribution measurement device 200 and constitutes a particle diameter distribution measurement system 300. The density gradient liquid production apparatus 100 produces a density gradient liquid consisting of a sucrose solution in a measurement cell (C) (for example, a rectangular cuvette cell with a square cross section) used in the particle diameter distribution measurement device 200. Then the particle diameter distribution measurement device 200 measures particle diameter distribution of a measurement sample by a line start method using the produced density gradient liquid.

The density gradient liquid production apparatus 100 is configured to receive a target value of a hydrogen ion ($H^+$) concentration (hereinafter also referred to as a target hydrogen ion concentration) according to the measurement sample from a user and produce the density gradient liquid with the target hydrogen ion concentration by mixing a plurality of sucrose solutions each of which has a different hydrogen ion concentration and density.

Concretely, as shown in FIG. 1, the density gradient liquid production apparatus 100 comprises a first solution preparation unit 1 that prepares a first sucrose solution 31 with the target hydrogen ion concentration and a first density by mixing a plurality of the sucrose solutions, a second solution preparation unit 2 that prepares a second sucrose solution 32 with the target hydrogen ion concentration and a second density that is higher than the first density by mixing a plurality of the sucrose solutions, a mixed solution preparation unit 3 that creates a mixed sucrose solution with the target hydrogen ion concentration by mixing the prepared first sucrose solution 31 and the prepared second sucrose solution 32 and supplies the mixed sucrose solution to the measurement cell (C) while varying a density of the mixed sucrose solution and a control unit 4 that controls each of the solution preparation units 1, 2 and 3.

(First Solution Preparation Unit 1)

The first solution preparation unit 1 prepares the first sucrose solution 31 by mixing a plurality (two in this embodiment) of the sucrose solutions 11a and 11b (hereinafter also referred to as the first reference sucrose solution) whose hydrogen ion concentration and density are known and supplies the prepared first sucrose solution 31 to the mixed solution preparation unit 3.

Concretely, the first solution preparation unit 1 comprises two types of the first reference sucrose solutions 11a and 11b, each of which has a different hydrogen ion concentration and both of which have the first density, two primary pumps 12a and 12b that feed each of the first reference sucrose solutions 11a and 11b respectively, and the primary mixing unit 13 that mixes the first reference sucrose solutions 11a and 11b fed from each of the primary pumps 12a and 12b and supplies the mixed sucrose solution to the mixed solution preparation unit 3. In this embodiment, one of the two first reference sucrose solutions 11a and 11b is an acidic solution with a pH below 7 and the other is an alkaline solution with the pH above 7. The first solution preparation unit 1 is configured to prepare the first sucrose solution 31 with the desired pH by varying a ratio of an amount fed from each of the primary pumps 12a and 12b based on a control signal received from the control unit 4.

Each of the primary pumps 12a and 12b sucks out each of the first reference sucrose solutions 11a and 11b contained in a container through a tube and feeds the first reference sucrose solutions 11a and 11b to the primary mixing unit 13. The primary pumps 12a and 12b are capable of continuously feeding a minute amount of a solution and are micropumps such as roller pumps (tubing pumps) that feed a liquid by squeezing a soft tube (silicon tube or the like) through which the liquid flows with a rotating roller.

The primary mixing unit 13 comprises a plurality of primary branch flow channels 131a and 131b through which the first referenced sucrose solutions 11a and 11b fed from each of the primary pumps 12a and 12b respectively flow, and a primary confluence flow channel 132 where each of the primary branch flow channels 131a and 131b joins. The first reference sucrose solutions 11a and 11b fed from each of the primary pumps 12a and 12b are mixed by being joined in the primary confluence flow channel 132 so that the first sucrose solution 31 with both the target hydrogen ion concentration and the first density is produced.

(Second Solution Preparation Unit 2)

The second solution preparation unit 2 prepares the second sucrose solution 32 by mixing a plurality (two in this embodiment) of sucrose solutions 21a and 21b (hereinafter also referred to as the second reference sucrose solution) whose hydrogen ion concentration and density are known and supplies the prepared second sucrose solution 32 to the mixed solution preparation unit 3.

Concretely, the second solution preparation unit 2 comprises two types of second reference sucrose solutions 21a and 21b, each of which has a different hydrogen ion concentration and both of which have the second density, two primary pumps 22a and 22b each of which feeds the second reference sucrose solutions 21a and 21b fed from each of the primary pumps 22a and 22b respectively, and the primary mixing unit 23 that mixes the second reference sucrose solutions 21a and 21b and supplies the mixed solutions 21a and 21b to the mixed solution preparation unit 3. In this embodiment, one of the second reference sucrose solutions 21a and 21b is an acidic solution with the pH below 7 and the other is an alkaline solution with the pH above 7. The second solution preparation unit 2 is configured to prepare the second sucrose solution 32 with the desired hydrogen ion concentration by varying the ratio of the amount of the solution fed from each of the primary pumps 22a and 22b based on the control signal received from the control unit 4. The configuration of each of the primary pumps 22a and 22b and the primary mixing unit 23 of the second solution preparation unit 2 is the same as that of the primary pumps 12a and 12b and the primary mixing unit 13 of the first solution preparation unit 1 described above, and a detailed description is omitted here.

(Mixed Solution Preparation Unit 3)

The mixed solution preparation unit 3 comprises the first sucrose solution 31 (with the target hydrogen ion concentration and the first density) fed from the first solution preparation unit 1, the second sucrose solution 32 (with the target hydrogen ion concentration and the second density) fed from the second solution preparation unit 2, and a plurality (two in this embodiment) of secondary pumps 33a and 33b that feed the first sucrose solution 31 and the second sucrose solution 32 respectively, a secondary mixing unit 34 that mixes the first sucrose solution 31 and the second sucrose solution 32 fed from each of the secondary pumps 33a and 33b and supplies the mixed sucrose solution to the measurement cell (C). The mixed solution preparation unit 3 is configured to change the density of the produced mixed sucrose solution by varying the ratio of the amount of the solution fed from each of the secondary pumps 33a and 33b based on the control signal received from the control unit 4. In this embodiment, each of the first sucrose solution 31 fed from the first solution preparation unit 1 and the second sucrose solution 32 fed from the second solution preparation unit 2 is contained in a respective container.

Each of the secondary pumps 33a and 33b sucks out the first sucrose solution 31 and the second sucrose solution 32 contained in the containers through tubes and feeds the sucked first sucrose solution 31 and the sucked second sucrose solution 32 to the secondary mixing unit 34. The secondary pumps 33a and 33b are capable of continuously feeding minute amounts of the solution and are micropumps such as roller pumps, similar to the primary pumps.

The secondary mixing unit 34 comprises a plurality of secondary branch flow channels 341a and 341b through which each of the first sucrose solution 31 and the second sucrose solution 32 fed from each of the secondary pumps 33a and 33b flows, and a secondary confluence flow channel 342 where each of the secondary branch flow channels 341a and 341b joins. The first sucrose solution 31 and the second sucrose solution 32 fed from each of the secondary pumps 33a and 33b are mixed by being joined in the secondary confluence flow channel 342. At a downstream end part of the secondary confluence flow channel 342 provided is a liquid inlet port for injecting the mixed solution into the measurement cell (C) arranged at a predetermined position.

(Control Unit 4)

Figure 2:
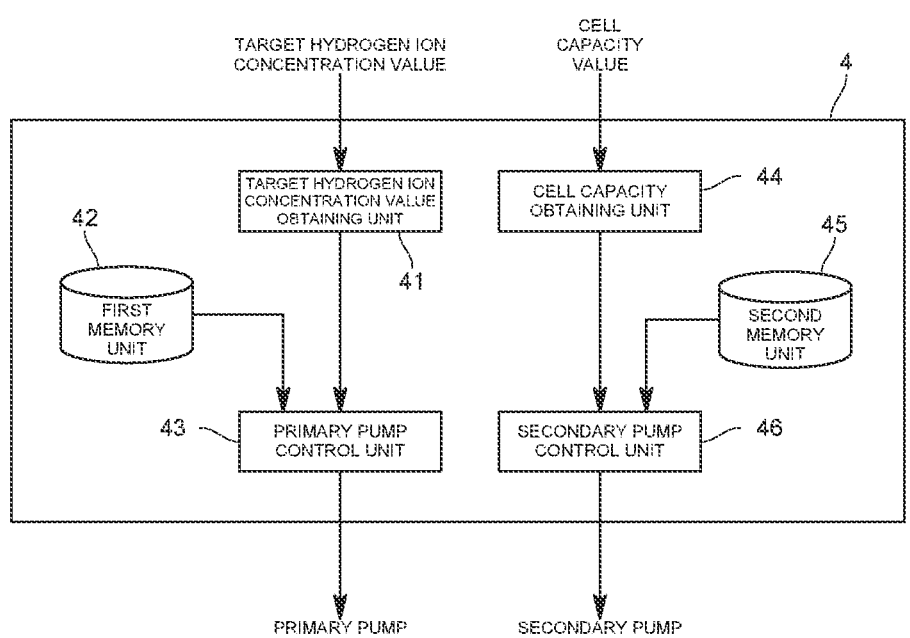
FIG. 2 A functional block diagram of the density gradient liquid production apparatus of this embodiment.

The control unit 4 is a general-purpose or dedicated computer comprising a CPU, a memory and input/output interfaces. The control unit 4 cooperates with the CPU and peripheral devices according to predetermined programs stored in a predetermined area of the memory to perform at least the following functions, as shown in FIG. 2, as a target hydrogen ion concentration obtaining unit 41, a first memory unit 42, a primary pump control unit 43, a cell capacity obtaining unit 44, a second memory unit 45 and a secondary pump control unit 46.

The target hydrogen ion concentration obtaining unit 41 obtains the target hydrogen ion concentration value input by the user. The user inputs the target hydrogen ion concentration value using an input device such as, for example, a keyboard, a touch panel or the like. After obtaining the target hydrogen ion concentration value, the target hydrogen ion concentration obtaining unit 41 transmits this value to the primary pump control unit 43.

The first memory unit 42 is set in a predetermined area of the memory and previously stores a first mixing ratio data indicating a relationship between a mixing ratio of each of the first reference sucrose solutions 11a and 11b, or a ratio equivalent to the mixing ratio (for example, a feed amount of each of the primary pumps 12a and 12b and/or a ratio of the feed amount, a rotation speed of a roller of each of the primary pumps 12a and 12b and/or a ratio of the rotation speed) and the hydrogen ion concentration value of the first sucrose solution 31 after mixed. In addition, similarly, the first memory unit 42 previously stores a second mixing ratio data indicating a relationship between a mixing ratio of each of the second reference sucrose solutions 21a and 21b, or a ratio equivalent to the mixing ratio (for example, a feed amount of each of the primary pumps 22a and 22b and/or a ratio of the feed amount, a rotation speed of a roller of each of the primary pumps 22a and 22b and/or a ratio of the rotation speed) and the hydrogen ion concentration value of the second sucrose solution 32 after mixed. In addition, the first memory unit 42 stores a primary pump performance data indicating a relationship between a rotation amount of the roller of each of the primary pumps 12 and 22 and the feed amount of the roller of each of the primary pumps 12 and 22.

When the primary pump control unit 43 obtains the target hydrogen ion concentration value from the target hydrogen ion concentration value obtaining unit, the primary pump control unit 43 refers to the first mixing ratio data, the second mixing ratio data, and the primary pump performance data stored in the first memory unit 42 and operates each of the primary pumps 12 and 22 provided by the first solution preparation unit 1 and the second solution preparation unit 2 respectively. Concretely, the rotation speed of the roller of each of the primary pumps 12 and 22 and the ratio of the rotation speed are controlled to correspond to the mixing ratio indicated by each of the respective mixing ratio data. In this embodiment, the primary pump control unit 43 controls each of the primary pumps 12 and 22 to adjust a predetermined amount of the first sucrose solution 31 and the second sucrose solution 32 respectively set by the user in advance.

The cell capacity obtaining unit 44 obtains a capacity value of the measurement cell (C) input by the user. The user inputs the capacity value using an input means such as, for example, a keyboard or a touch panel. When the cell capacity obtaining unit 44 obtains the capacity value of the cell, the cell capacity obtaining unit 44 transmits the capacity value to the secondary pump control unit 46.

The secondary memory unit 45 is set in a predetermined area of the memory and previously stores a density gradient data indicating a time change of the mixing ratio of the first sucrose solution 31 and the second sucrose solution 32 or a ratio equivalent to the mixing ratio (for example, a feed amount of each of the secondary pumps 33a and 33b and/or the ratio of the feed amount, a rotation speed of a roller of each of the secondary pumps 33a and 33b and/or a ratio of the rotation speed). The density gradient data indicates, for example, a relationship between the elapsed time from starting production of the mixed solution and the mixing ratio of the first sucrose solution 31 and the second sucrose solution 32 and the density of the mixed solution is so set to become larger (or smaller) with the lapse of time. In addition, the secondary memory unit 45 also stores secondary pump performance data that indicates a relationship between the rotation amount of the roller of each of the secondary pumps 33a and 33b and the feed amount of the solution.

When the secondary pump control unit 46 obtains the cell capacity value from the cell capacity obtaining unit 44, the secondary pump control unit 46 refers to the density gradient data and the secondary pump performance data stored in the second memory unit 45 and operates each of the secondary pumps 33a and 33b. Concretely, the rotation speed of the roller of each of the secondary pumps 33a and 33b and the ratio of the rotation speed are controlled to correspond to the mixing ratio indicated by each of the density gradient data. In this embodiment, the secondary pump control unit 46 controls each of the secondary pumps 33a and 33b so that a total amount of the mixed solution to be adjusted does not exceed the cell capacity value.

Next, the operation of producing the density gradient liquid by the density gradient liquid production apparatus 100 is explained with reference to FIG. 3.

Figure 3:
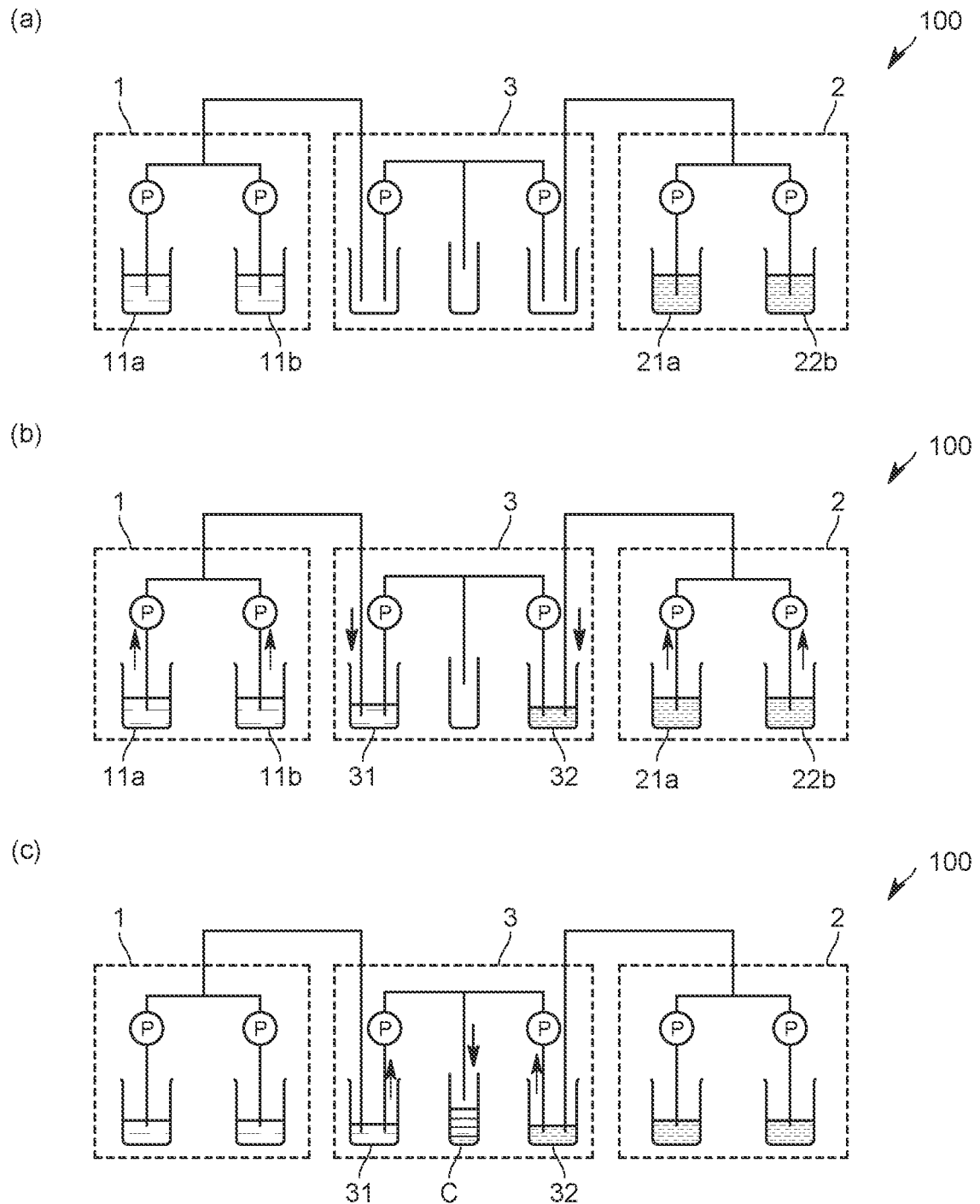
FIG. 3 A view explaining an operation of the density gradient liquid production apparatus of this embodiment.

First, the user prepares two types of the first reference sucrose solutions 11a and 11b and two types of the second reference sucrose solutions 21a and 21b whose hydrogen ion concentration and density have been adjusted to predetermined values in advance and sets the first reference sucrose solutions 11a and 11b and the second reference sucrose solutions 21a and 21b at predetermined positions of the density gradient liquid production apparatus 100 (FIG. 3(a)). Next, the user operates an operation panel provided in the density gradient liquid production apparatus 100 to input the target hydrogen ion concentration value and the cell capacity value, and then turns on a button to start production of the density gradient liquid. Then, the first solution preparation unit 1 mixes the two first reference sucrose solutions 11a and 11b to prepare the first sucrose solution 31 with the target hydrogen ion concentration and the first density and supplies the prepared first sucrose solution 31 to a container of the mixing adjustment unit. At the same time, the second solution preparation unit 2 mixes the two second reference sucrose solutions 21a and 21b to prepare the second sucrose solution 32 with the target hydrogen ion concentration and the second density and supplies the prepared second sucrose solution 32 to the container of the mixing adjustment unit (FIG. 3 (b)). After the first sucrose solution 31 and the second sucrose solution 32 with a predetermined amount or more are adjusted by the first solution preparation unit 1 and the second solution preparation unit 2, the mixed solution preparation unit 3 prepares the mixed solution with the target hydrogen ion concentration and supplies the prepared mixed solution to the measurement cell (C) (FIG. 3 (c)). Concretely, the first sucrose solution 31 and the second sucrose solution 32 are supplied to the measurement cell (C) with changing its density by mixing the first sucrose solution 31 and the second sucrose solution 32 while changing the mixing ratio. The mixed solution preparation unit 3 finishes producing the mixed solution when the total liquid volume of the prepared mixed liquid reaches the cell capacity value.

In accordance with the density gradient liquid production apparatus 100 of this embodiment, since it is possible to prepare the first sucrose solution 31 and the second sucrose solution 32 with the target hydrogen ion concentrations by mixing a plurality of the reference sucrose solutions each of whose hydrogen ion concentrations differs and to produce the density gradient liquid with the target hydrogen ion concentration in the measurement cell (C) by using the prepared first sucrose solution 31 and the prepared second sucrose solution 32, a plurality of density gradient liquids each of whose hydrogen ion concentrations differs can be efficiently produced. More specifically, if the density gradient liquid production apparatus 100 is used, there is no need for a user to prepare the first sucrose solution 31 and the second sucrose solution 32 individually by adjusting the hydrogen ion concentration of the first sucrose solution 31 and the hydrogen ion concentration of the second sucrose solution 32 in accordance with the hydrogen ion concentration of the density gradient liquid to be prepared. Then, if at least two reference sucrose solutions with different hydrogen ion concentration are prepared for preparing the first sucrose solution 31 and the second sucrose solution 32 respectively, it is possible to produce the density gradient liquid with an arbitrary hydrogen ion concentration by using the produced reference sucrose solutions so that a plurality of density gradient liquids each of whose hydrogen ion concentrations differs can be efficiently produced.

The present claimed invention is not limited to the above-described embodiments.

Figure 4:
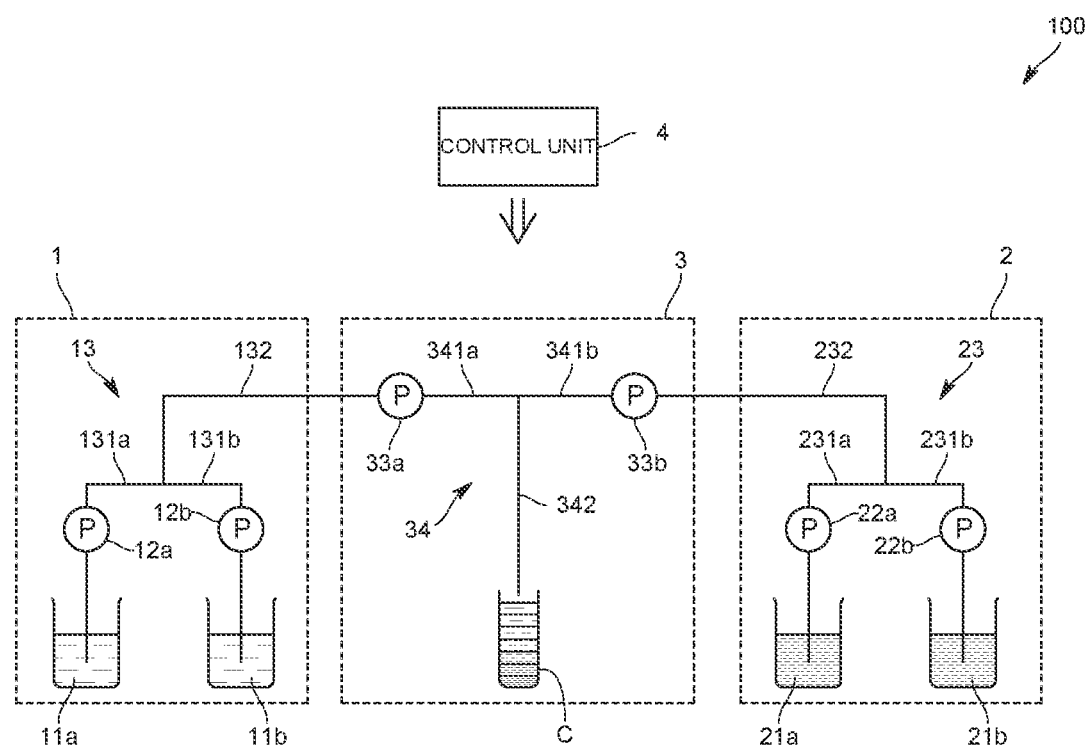
FIG. 4 A view schematically showing a configuration of the density gradient liquid production apparatus of the other embodiment.

For example, in the density gradient liquid production apparatus 100 of the above-mentioned embodiment, the first sucrose solution 31 and the second sucrose solution 32 prepared by the first solution preparation unit 1 and the second solution preparation unit 2 are once stored in the container provided by the mixed solution preparation unit 3 and then sucked out by the secondary pumps 33a and 33b so that the mixed solution are prepared, however, it is not limited to this. The density gradient liquid production apparatus 100 of the other embodiment may be, as shown in FIG. 4, configured so that the primary mixing units 13 and 23 provided by the first solution preparation unit 1 and the second solution preparation unit 2 directly supply the prepared first sucrose solution 31 and the prepared second sucrose solution 32 to the secondary pumps 33a and 33b provided by the mixing solution preparation unit 3.

In addition, in this case, the mixed liquid preparation unit 3 may not be provided with the secondary pumps 33a and 33b and may be configured so that the first sucrose solution 31 and the second sucrose solution 32 prepared in each of the primary mixing units 13 and 23 are directly supplied to each of secondary branch flow channels 341a and 341b without passing through the secondary pumps 33a and 33b.

Figure 5:
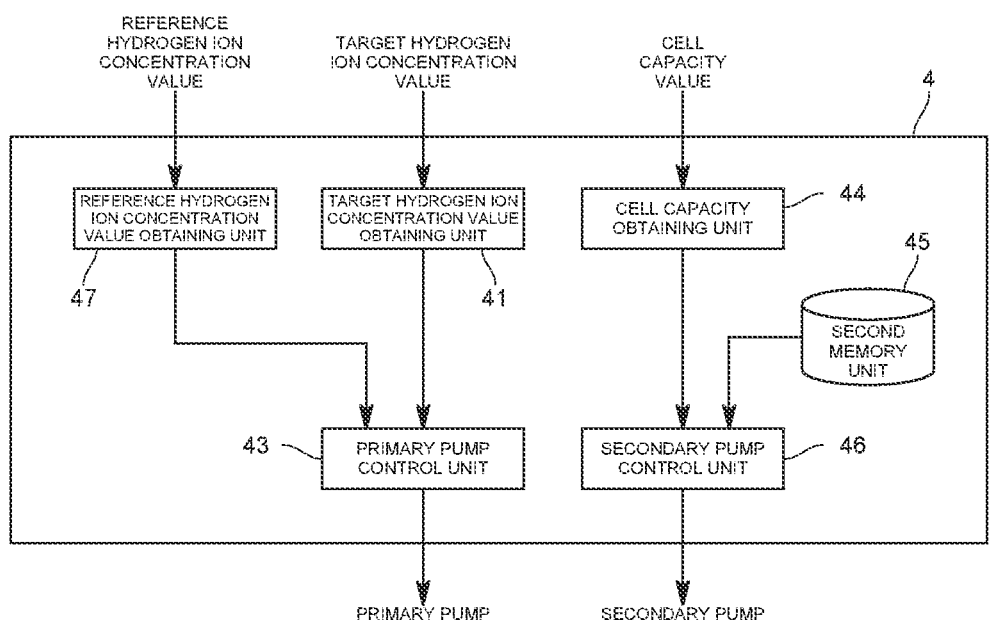
FIG. 5 A functional block diagram of the density gradient liquid production apparatus of the other embodiment.

The density gradient liquid production apparatus 100 of the other embodiment may be configured to obtain the hydrogen ion concentration values and the target hydrogen ion concentration value of each of the reference sucrose solutions by the user input, and to control the primary pumps 12 and 22 based on the obtained hydrogen ion concentration values and the obtained target hydrogen ion concentration value of each of the reference sucrose solutions. In this case, as shown in FIG. 5, the control unit 4 may further comprise a function as the reference hydrogen ion concentration value obtaining unit 47 that obtains the hydrogen ion concentration values of the first reference sucrose solutions 11a, 11b and the second reference sucrose solutions 21a, 21b respectively.

In addition, the density gradient liquid production apparatus 100 of the above-mentioned embodiment accepts the target hydrogen ion concentration value from the user and produces the density gradient liquid with the target hydrogen ion concentration, however, it is not limited to this. In other embodiment, it may be configured to accept a target pH value from the user and to produce the density gradient liquid with the target pH value.

The density gradient liquid production apparatus 100 of the above-mentioned embodiment produces the density gradient liquid with the target hydrogen ion concentration wherein the agglomeration inhibiting component is a hydrogen ion, however, it is not limited to this. The density gradient liquid production apparatus 100 of the other embodiment may produce the density gradient liquid wherein the agglomeration inhibiting component is a surface-active agent and the density gradient liquid contains the surface-active agent with a predetermined target concentration. In this case, the first solution preparation unit 1 and the second solution preparation unit 2 may prepare the first sucrose solution 31 and the second sucrose solution 32 by mixing a plurality of the reference sucrose solutions whose surface-active agent concentration and density are known.

In addition, in the above-mentioned embodiment, the density gradient liquid is made of a sucrose solution, however, it is not limited to this. In the other embodiment, the density gradient liquid may be made of other solutions such as halocarbons.

The density gradient liquid production apparatus 100 of the above-mentioned embodiment is used together with the particle diameter distribution measurement apparatus 200, however, it may be used alone. In addition, the measurement cell (C) is not limited to a cuvette cell, however, it may be of any other type.

In the above-mentioned embodiment, the pumps provided by the first solution preparation unit 1, the second solution preparation unit 2 and the mixed solution preparation unit 3 are micropumps that can pump a small amount of liquid, however, they are not limited to this and may be of other types.

In the above-mentioned embodiment, one of the two types of the reference sucrose solutions to be mixed in the first solution preparation unit 1 and the second solution preparation unit 2 is acidic and the other is alkaline, however, it not limited to this. In the other embodiment, the reference sucrose solutions mixed in the first solution preparation unit 1 and the second solution preparation unit 2 may be acidic, neutral or alkaline as long as the hydrogen ion concentrations are different.

In addition, in the above-mentioned embodiment, a plurality of the reference sucrose solutions each of whose densities is equal are mixed in the first solution preparation unit 1 and the second solution preparation unit 2, however, it is not limited to this. In the other embodiment, the first sucrose solution 31 and the second sucrose solution 32 may be prepared respectively by mixing a plurality of the reference sucrose solutions each of whose densities differs in the first solution preparation unit 1 and the second solution preparation unit 2.

In the above-mentioned embodiment, the first solution preparation unit 1, the second solution preparation unit 2, the mixed liquid preparation unit 3, and the control unit 4 are arranged in a single device, however, it is not limited to this. In the other embodiment, they may be arranged respectively in different devices.

It goes without saying that this invention is not limited to the above-mentioned embodiments, and various other modifications are possible without departing from a spirit of this invention.

Possible Applications in Industry

In accordance with the above-mentioned density gradient liquid production apparatus of the present claimed invention, it is possible to efficiently produce a plurality of density gradient liquids each of whose concentrations of agglomeration inhibitor components differs.

The invention claimed is:

1. A density gradient liquid production apparatus for producing a density gradient liquid in a measurement cell for a centrifugal sedimentation type particle diameter distribution measurement device, comprising
    a first solution preparation unit that prepares a first solution with a predetermined target concentration and a first density by mixing a plurality of first reference solutions each of whose concentrations of an agglomeration inhibiting component that inhibits agglomeration of particles differs, wherein the first solution preparation unit includes a plurality of first primary pumps respectively feeding the plurality of first reference solutions along first primary branch flow channels, and a first primary confluence channel in which the plurality of first reference solutions are received and mixed,
    a second solution preparation unit that prepares a second solution with the predetermined target concentration and a second density that is different from the first density by mixing a plurality of second reference solutions each of whose concentrations of the agglomeration inhibiting component differs, wherein the second solution preparation unit includes a plurality of second primary pumps respectively feeding the plurality of second reference solutions along second primary branch flow channels, and a second primary confluence channel in which the plurality of second reference solutions are received and mixed, and
    a mixed solution preparation unit that creates a mixed solution with the target concentration by mixing the first solution and the second solution and supplies the created mixed solution to the measurement cell while varying a density of the mixed solution, wherein the mixed solution preparation unit includes two secondary pumps that respectively feed the first solution and the second solution along secondary branch flow channels, and a secondary confluence flow channel in which the first solution and the second solution are received and mixed.

2. The density gradient liquid production apparatus described in claim 1, wherein
    the first solution preparation unit prepares the first solution by mixing a plurality of the first reference solutions each of whose densities is equal, and
    the second solution preparation unit prepares the second solution by mixing a plurality of the second reference solutions each of whose densities is equal.

3. The density gradient liquid production apparatus described in claim 1, wherein
    the agglomeration inhibiting component is at least one of a hydrogen ion and a surface-active agent.

4. The density gradient liquid production apparatus described in claim 3, wherein
    the agglomeration inhibiting component is the hydrogen ion,
    the first solution preparation unit prepares the first solution by mixing the acidic first reference solution with the alkaline first reference solution, and
    the second solution preparation unit prepares the second solution by mixing the acidic second reference solution with the alkaline second reference solution.

5. The density gradient liquid production apparatus described in claim 1, wherein
    the first solution with a desired concentration of the agglomeration inhibiting component is prepared by changing a volume ratio of the first reference solutions fed by each of the first primary pumps, and the second solution with a desired concentration of the agglomeration inhibiting component is prepared by changing a volume ratio of the second reference solutions fed by each of the secondary primary pumps.

6. The density gradient liquid production apparatus described in claim 5, further comprising a hardware processor that functions as a target concentration obtaining unit that obtains a target concentration value from a user using an input device, and a primary pump control unit that controls a rotation speed of each of the first primary pumps provided by the first solution preparation unit and the second primary pumps provided by the second solution preparation unit respectively according to the obtained target concentration value.

7. The density gradient liquid production apparatus described in claim 1, wherein the density of the mixed solution to be created is varied by changing a volume ratio of the solutions fed by each of the secondary pumps.

8. The density gradient liquid production apparatus described in claim 7, further comprising a hardware processor that functions as a cell capacity obtaining unit that obtains a capacity of the measurement cell from a user using an input device, and a secondary pump control unit that controls the rotation speed of each of the secondary pumps according to the obtained capacity of the measurement cell.

9. The density gradient liquid production apparatus described in claim 7, wherein the first primary pumps, the second primary pumps, and the secondary pumps are micropumps.

10. A particle diameter distribution measurement system comprising the density gradient liquid production apparatus described in claim 1, and a centrifugal sedimentation particle diameter distribution measurement apparatus for measuring particle diameter distribution by a line start method using the density gradient liquid produced by the density gradient liquid production apparatus.

11. A density gradient liquid production method that produces a density gradient liquid in a measurement cell for a centrifugal sedimentation particle diameter distribution measurement device, comprising a first solution preparation process for preparing a first solution with a predetermined target concentration and a first density by mixing a plurality of first reference solutions each of whose concentrations of an agglomeration inhibiting component that inhibits agglomeration of particles differs, a second solution preparation process for preparing a second solution with the target concentration and a second density that is different from the first density by mixing a plurality of second reference solutions each of whose concentrations of the agglomeration inhibiting component differs, and a mixed solution preparing process for creating a mixed solution with the target concentration by mixing the first solution and the second solution and supplies the created mixed solution to the measurement cell while varying a density of the mixed solution.

12. A particle diameter distribution measurement method for measuring particle diameter distribution by a line start method using a density gradient liquid produced by the density gradient liquid production method described in claim 11 and a centrifugal sedimentation type particle diameter distribution measurement device.

* * * * *